United States Patent [19]

Reitz

[11] 4,349,615
[45] * Sep. 14, 1982

[54] RECHARGEABLE ELECTROCHEMICAL CELL AND METHOD FOR CHARGING SAME

[76] Inventor: Ronald P. Reitz, P.O. Box 1543, Annapolis, Md. 21404

[ * ] Notice: The portion of the term of this patent subsequent to Apr. 27, 1999, has been disclaimed.

[21] Appl. No.: 219,491

[22] Filed: Dec. 23, 1980

[51] Int. Cl.³ .......................................... H01M 6/38
[52] U.S. Cl. .............................. 429/110; 429/113; 429/118; 429/127
[58] Field of Search ............... 429/110, 113, 127, 156, 429/225, 227, 228, 117, 118, 52, 48

[56] References Cited

U.S. PATENT DOCUMENTS

| 228,888 | 6/1880 | Griscom | 429/110 X |
| 395,028 | 12/1888 | Bailey et al. | 429/127 |
| 3,743,543 | 7/1973 | Chiku et al. | 429/193 X |
| 3,827,912 | 8/1974 | Justice | 429/14 X |
| 4,001,037 | 1/1977 | Beck | 429/188 |
| 4,076,909 | 2/1978 | Lindstrom | 429/207 |

Primary Examiner—Anthony Skapars

[57] ABSTRACT

A rechargable electrochemical cell has a negative electrode; a positive electrode spaced therefrom; an electrolyte solution in which portions of said negative and said positive electrodes are immersed; a flexible housing means whereby said electrodes and electrolyte solution are housed; a means whereby said flexible housing may be crimped or bent such that said crimping or bending restricts or prevents altogether the free flow of electrolytic ions from said negative electrode to said positive electrode or from said positive electrode to said negative electrode; a third electrode means on one side of the portion of said flexible housing which may be bent or crimped but spaced therefrom, said third electrode means being spaced proximate to but electrically insulated from said electrolyte solution; and a fourth electrode means on the side of the bendable portion of said flexible housing which is opposite that side occupied by said third electrode means, said fourth electrode means being spaced proximate to but electrically insulated from said electrolyte solution.

5 Claims, 1 Drawing Figure

RECHARGEABLE ELECTROCHEMICAL CELL AND METHOD FOR CHARGING SAME

FIELD OF THE INVENTION

The field of the invention is in the field of electrochemical cells and means for charging same.

DESCRIPTION OF PRIOR ART

Prior art electrochemical cells have been charged by connecting electrically a power source to the cathode and anode of the said electrochemical cell. The power source then drives the charging reactions within the cell and electrical energy is thereby stored by the cell.

It is an object of this invention to provide an electrochemical storage cell which may be charged by an alternative means.

It is another object of this invention to provide an electrochemical storage cell which may be charged efficiently.

The instant invention comprises any known wet cell electrochemical storage cell components (i.e. cathode, anode and electrolyte solution), an electrically insulative, flexible housing means whereby said cathode and anode and electrolyte solution are housed; a means whereby said flexible housing may crimped or bent such that said crimping or bending restricts or prevents altogether the free flow of electrolytic ions from said cathode to said anode and from said anode to said cathode, a third electrode means (i.e. an electrode means other than the cathode and anode) spaced proximate and spaced from the bending or crimping portion of said flexible housing means, said third electrode means also being spaced proximate to but electrically insulated from said electrolyte solution; and a fourth electrode means being spaced proximate to and spaced from the bending or crimping portion of said flexible housing means, said fourth electrode means being spaced proximate to but electrically insulated from said electrolyte solution, said fourth electrode also being positioned opposite to said third electrode means with respect to the crimping or bending portion of said flexible housing.

The third and fourth electrodes may be oppositely charged when the bending or crimping portion of said flexible housing is not bent or crimped so that electrolytic ions may freely flow through said bending or crimping portion of said flexible housing means. Since each electrode is charged (i.e. the third and fourth electrode means are charged) electrolytic ions are displaced by this charge such that the charge on said third and fourth electrodes attract electrolytic ions of opposite charge and thus causes opposite charged electrolytic ions to form on the insulating means. (i.e. the means whereby said third electrode means is electrically insulated from said electrolyte solution and the means whereby the fourth electrode means is electrically insulated from said said electrolyte solution.) It is acknowledge here that the potential (i.e. voltage potential) difference between said third and fourth electrode means must be greater than the voltage required to charge the anode and cathode means (were said anode and cathode means to be charged by conventional means). If the potential is less than this, the potential is not great enough to drive the charging reaction of the electrochemical cell.

After the electrolyte ions have accumulated on the insulating means opposite the third and fourth electrode means, such that electrolytic ions are no longer displaced due to the charge on said third and fourth electrolyte means, the electrically insulative, flexible housing means is bent or crimped at the bending or crimping portion of said housing such that electrolytic ions are prevented from passing through this portion of said housing. Thus electrolyte ions are not permitted to flow from the cathode to the anode or from the anode to the cathode. It is noted that the bend or crimp in the housing is the means whereby this is prevented. The means for restricting the flow of electrolytic ions does not, therefore, comprise a separator means utilizing a rotatable member of beta-alumina crystal.

After the housing means has been crimped, the cathode and anode means of the electrochemical cell are electrically connected to each other. Afterward, said third and fourth electrodes are electrically connected to each other. The third and fourth electrodes thus connected discharge. The electrolytic ions opposite said third and fourth electrodes with respect to the insulating means are therefore no longer held together on the surface of the insulating surfaces. These ions migrate toward the anode and cathode of the electrochemical cell at whose surfaces the ions cause the charging reactions to occur.

DRAWINGS

FIG. 1 is a sectional view of the device and accompanying circuitry.

DETAILED DESCRIPTION OF PREFERRED EMBODIMENTS

Figure 1:
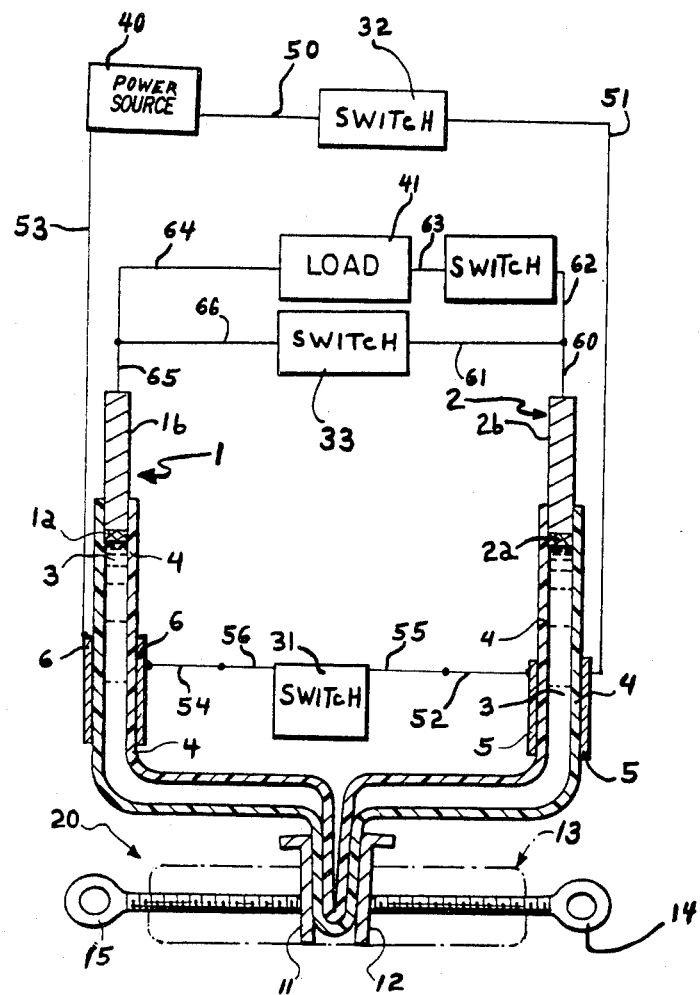

Referring now to FIG. 1, a typical embodiment 10 of the present invention comprises an electrically discharged electrochemical cell wherein electrode 1 and electrode 2 comprise the anode and cathode of the electrically discharged cell, an electrolyte solution 3, an electrically insulative, flexible, non-porous housing means 4, a third electrode means 5 positioned with respect to the housing means 4 as shown in the drawing FIG. 1, a fourth electrode means 6 positioned with respect to housing means 4 as shown in the drawing FIG. 1 and a crimping or bending means 20 whereby said housing means 4 may be bent or crimped as shown in FIG. 1.

Electrodes 1 and 2 comprise, a conductive base plate 1b, another conductive base plate 2b, both base plates 1b and 2b comprising merely a conductor which plays no active role in the electrochemical reactions of the cell except to give a good electrical contact to the active materials 1a and 2a, an active material 1a and a second active material 2a. Thus electrodes 1b and 2b may comprise titanium, as taught in U.S. Pat. No. 4,001,037 or other electrical conductor such as aluminium, etc. Electrodes 1a and 2a comprise, in this embodiment, lead sulfate ($PbSO_4$); electrolyte solution means 3 comprises, in this embodiment, sulfuric acid ($H_2SO_4$) in aqueous solution; said housing means 4 comprises rubber, electrodes 5 and 6 comprise any good electrically conductive material such as silver, aluminum, gold, zinc, lead or other electrically conductive material, and bending or crimping means 20 comprises a turnbuckle, with protective plates. Specifically, said turnbuckle with protective plates (i.e. said bending or crimping means 20 in this embodiment) comprises screw 14, screw 15, rigid metal brace 13 which is the dotted component of FIG. 1, metal plate 11 and metal plate 12.

It is appreciated that the scope of the invention is quite broad in that electrodes 1a and 2a and electrolyte solution 3 may be any known anode, cathode and electrolyte solution means combination of an electrically discharged or partially electrically discharged wet cell rechargeable electrochemical storage cell. Thus, the invention is not restricted to the specific use of $PbSO_4$ as electrodes 1a and 2b in conjunction with the use of electrolyte solution of $H_2SO_4$. Instead, electrodes 1a and 2a and electrolyte solution 3 may comprise the elements of any electrically discharged known wet cell electrochemical storage cell, such as, for instance, electrodes 1a and 2a may comprise $Pb(ClO_4)_2$ and electrolyte means 3 may comprise $HClO_4$ in aqueous solution. This combination of electrically discharged electrochemical storage cell elements may be found in U.S. Pat. No. 4,001,037. Alternatively, electrodes 1a and 2a may also comprise $Fe(OH)_2$ as one electrode and $PbSO_4 \cdot 4PbO \cdot H_2O$ as the other electrode while electrolyte solution 3 may comprise KOH AND $K_2SO_4$ in aqueous solution. This combination of electrically discharged electrochemical storage cell elements may be found in U.S. Pat. No. 4,076,909. It is appreciated that many other known electrochemical storage cells which are wet cells comprise, in the electrically discharged state, combinations of anode, cathode and electrolyte solution means employable in this invention.

It is further appreciated that there must exist at all times within the electrolyte solution some electrolytic ions in aqueous solution. This condition must be met even at those times when the cell has been discharged. If this condition is not met, then it is quite possible that the electrochemical storage cell 10 may not be capable of being charged in the manner to be discribed in this disclosure. Thus, the electrochemical storage cell components of anode, cathode and electrolyte solution must initially be made such that even after the electrochemical cell 10 has been discharged, there are still some electrolytic ions still in aqueous solution.

With this knowledge understood, the preferred embodiment of electrodes 1a and 2a comprising $PbSO_4$ and electrolyte solution comprising $H_2SO_4$ ions in aqueous solution is hitherto referred to in this disclosure.

Referring to FIG. 1, initially said electrochemical storage cell device 10 is electrically discharged. From this initial state, operation of the device is described.

In operation, initially switches 31, 32, 33 and 34 are open. Then, switch 32 is closed such that power source 40 is electrically connected to electrodes 5 and 6, shown in FIG. 1, by means of electrically conductive wires 50, 51, and 53 all of which are sjhown in FIG. 1. The voltage applied to electrodes 5 and 6 by power source 40, which may be any appropriate power source such as a regulated power supply, must be greater than the voltage potential between electrode 1a and electrode 2a when said electrochemical storage cell device 10 is electrically charged up. Screw 14 is turned so as to relieve pressure upon the bent or crimped portion of said housing means 4 and thus allow electrolytic ions to pass through said bent or crimped portion of said housing means 4. Electrodes 6 and 5 are oppositely charged such that, for instance, electrode 5 has a net positive charge with respect to electrode 6 and electrode 6 has a net negative charge with respect to electrode 5. Electrolytic ions are displaced such that negative electrolytic ions form on the interior wall of said housing means 4 near the position of electrode 5.

Positive electrolytic ions form on the interior walls of said housing means 4 near the position of electrode 6.

Screw 14 is now turned so as to press plates 11 and 12 closer together, said plates 11 and 12 applying pressure to the bent or crimped portion of said housing means 4. Screw 14 continues to be turned, by means not shown on FIG. 1, said not shown means being manual means, until the pressure applied to said bent or crimped portion of said housing means 4 by said plates 11 and 12 is great enough so as to prevent the flow of electrolytic ions through the bent or crimped portion of said housing means 4.

Switch 32 is then opened. Afterward, switch 33 is then closed so that electrode 1 is electrically connected to electrode 2 by means of electrically conductive wires 60, 61, 65 and 66 which are shown in FIG. 1. Afterward, switch 31 is closed and the electrodes 5 and 6 discharge their electrical energy through electrically conductive wires 52, 54, 55 and 56 which are shown in FIG. 1. As electrodes 5 and 6 discharge, the electrolytic ions which formed on the interior walls of said housing means 4 repel each other. These ions therefore move through the electrolyte solution so as to place a negative charge on electrode 1a and a positive charge on electrode 2a. A potential (voltage) is thus formed across electrodes 1 and 2. Since this voltage potential is greater than the voltage potential difference between electrodes 1 and 2 when said electrochemical storage cell device 10 is charged, electrodes 1a and 2a react with the electrolyte solution so as to store some of the electrical energy of the voltage potential difference between electrodes 1 and 2. The reaction that occurs is

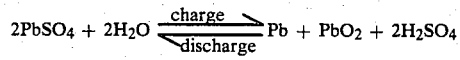

$$2PbSO_4 + 2H_2O \underset{\text{discharge}}{\overset{\text{charge}}{\rightleftharpoons}} Pb + PbO_2 + 2H_2SO_4$$

Afterward, switches 31 and 33 are opened. The charging process may then be repeated.

After the electrochemical storage cell device 10 has been charged, screw 14 may be manually turned so as to relieve the pressure upon the bent or crimped portion of said housing means 4 applied by said bending or crimping means 20. This relief of pressure must be appreciable enough to allow electrolytic ions to pass through said bent or crimped portion of said housing means 4. After this ion passage is permitted, switch 34 may then be closed and electrochemical storage cell device 10 may then supply electrical energy to load 41 through electrically conductive wires 60, 62, 63, 64 and 65 which are shown in FIG. 1.

Once electrochemical storage cell device 10 has discharged its stored electrical energy into load 41, switch 34 may be opened. Afterward, screw 14 may be turned manually so as to increase the pressure upon said bent or crimped portion of said housing means 4 applied thereto by plates 11 and 12. This pressure increase should be accomplished so that electrolytic ion flow through the bent or crimped portion of said housing means 4. After this, the entire system at its initial condition and the electrochemical storage cell device 10 may be again charged by repeating the process described in this disclosure.

It is appreciated that said housing means 4 may comprise any flexible, expandable, non-porous, electrically insulative material such as, for instance, rubber or plastic. It is further appreciated that the bending or crimping means whereby the bending or crimping portion of said housing means 4 is thereby bent or crimped need not necessarily be restricted to the turnbuckle 20 hitherto disclosed. Many possible bending or crimping means exist. Once possiblility is the use of a vice rather than the turnbuckle disclosed. Another possibility is the use of vice grip pliers. It is appreciated that many bending or crimping means may be employed in place of said turnbuckle 20 disclosed in the disclosure.

It is further appreciated that electrodes 5 and 6 need only be electrically insulated from and proximate to said electrolyte means 3. Thus, electrodes 5 and 6 could be located inside said housing means 4 and insulation means such a plastic or rubber could be used as a covering means and shielding means around said electrode means 5 and 6 from said electrolyte means 3. Thus the housing means need not necessarily act as the insulating means in order for the device to function.

I claim as my invention:

1. An electrochemical storage cell comprising:
   (a) a first electrode means which is a cathode means;
   (b) a second electrode means which is an anode means;
   (c) an electrolyte solution means in good physical contact with said first and said second electrode means;
   (d) a flexible, non-porous, electrically insulative housing means whereby said first and said second electrode means and said electrolyte solution are housed;
   (e) a means for bending said flexible housing such that said means for bending resticts or prevents altogether the free flow of electrolytic ions from said first electrode means to said second electrode means and from said second electrode means to said first electrode means;
   (f) a third electrode means spaced proximate and spaced from the bending portion of said flexible, non-porous, electrically insulative housing means, said third electrode means also being positioned proximate to but electrically insulated from said electrolyte solution;
   (g) and a fourth electrode means spaced proximate to the bending or crimping portion of said flexible, non-porous, electrically insulative housing means, said fourth electrode means being spaced proximate to but electrically insulated from said electrolyte solution, said fourth electrode means also being positioned opposite to said third electrode means with respect to the bending or crimping portion of said flexible housing.

2. A storage battery as cited in claim 1 wherein:
   (a) said first electrode comprises lead;
   (b) said second electrode means comprises lead oxide
   (c) said electrolyte means comprises sulfuric acid.

3. A storage battery as cited in claim 1 wherein:
   (a) said flexible, non-porous, electrically insulative housing means comprises rubber.

4. A storage battery as cited in 2 wherein:
   (a) said flexible, non-porous, electrically insulative housing means comprises rubber.

5. An electrical apparatus for use with an electrolyte solution in an electrochemical storage cell comprising:
   (a) a flexible housing means for said electrolyte solution,
   (b) a first and second electrode means spacedly positioned from one another and at least partially positioned within said housing means so that said first and second electrode means contact said electrolyte solution,
   (c) means positioned between said first and second electrode means for variably restricting the flow of electrolytic ions from said electrolyte solution from passing between said first and second electrode means said variable restricting means comprises means for variably bending at least a portion of said housing providing fluid communication of said electrolyte solution between said first and second electrode means so that the flow of electrolytic ions is variably restricted;
   (d) a third electrode means spaced from said variable restricting means and spaced electrically proximate but electrically insulated from said electrolyte solution with which said first electrode means is in contact therewith,
   (e) a fourth electrode means spaced from said variable restricting means and spaced electrically proximate but electrically insulated from said electrolyte solution with which said second electrode means is in contact therewith.

* * * * *